(12) United States Patent
Steven et al.

(10) Patent No.: US 11,706,399 B2
(45) Date of Patent: Jul. 18, 2023

(54) IMAGE GENERATION BASED ON ALTERED DISTANCES BETWEEN IMAGING DEVICES

(71) Applicant: Hewlett-Packard Development Company, L.P., Spring, TX (US)

(72) Inventors: Christopher Steven, Spring, TX (US); Andre da Fonte Lopes da Silva, Palo Alto, CA (US); Derek Kyle Joseph Kanas, Spring, TX (US); Guoxing Yang, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/486,025

(22) Filed: Sep. 27, 2021

(65) Prior Publication Data
US 2023/0102110 A1    Mar. 30, 2023

(51) Int. Cl.
*H04N 13/239* (2018.01)
*H04N 13/289* (2018.01)
*H04N 5/247* (2006.01)
*H04N 23/90* (2023.01)

(52) U.S. Cl.
CPC ......... *H04N 13/239* (2018.05); *H04N 13/289* (2018.05); *H04N 23/90* (2023.01)

(58) Field of Classification Search
CPC ..... H04N 13/239; H04N 5/247; H04N 13/289
USPC ........................................................ 348/47
See application file for complete search history.

(56) References Cited

U.S. PATENT DOCUMENTS

| 8,711,566 B2 * | 4/2014 | O'Brien ............... G06F 1/1624 361/724 |
| 9,036,001 B2 | 5/2015 | Chuang |
| 9,398,125 B1 * | 7/2016 | Hall .................... H04M 1/0235 |
| 10,715,787 B1 * | 7/2020 | Baumberg ........... H04N 13/239 |
| 2010/0194860 A1 | 8/2010 | Mentz |
| 2014/0098188 A1 * | 4/2014 | Kwak ................ H04N 5/23238 348/38 |
| 2014/0267617 A1 * | 9/2014 | Krig ..................... H04N 13/239 348/46 |
| 2017/0054968 A1 | 2/2017 | Woodman |
| 2019/0297238 A1 | 9/2019 | Klosterman |
| 2019/0342505 A1 | 11/2019 | McDevitt |
| 2020/0329572 A1 * | 10/2020 | Wittenberg .......... H05K 5/0017 |
| 2021/0173445 A1 * | 6/2021 | Kummer ............ H04M 1/0235 |

* cited by examiner

*Primary Examiner* — Susan E. Torgerson
(74) *Attorney, Agent, or Firm* — Knobbe, Martens, Olson & Bear, LLP (57) ABSTRACT

In some examples, the disclosure describes a device that includes a first imaging device coupled to a first side of an expandable display device, a second imaging device coupled to a second side of the expandable display device, an adjustment device to alter a size of the expandable display device to alter a distance between the first imaging device and the second imaging device, and a processor to: determine the distance between the first imaging device and the second imaging device based on a position of the adjustment device, capture first image data from the first imaging device and second image data from the second imaging device at the position of the adjustment device, and generate an image utilizing the first image data, the second image data, and the distance.

21 Claims, 8 Drawing Sheets

IMAGE GENERATION BASED ON ALTERED DISTANCES BETWEEN IMAGING DEVICES

BACKGROUND

Computing devices utilize display devices to display images to a user. The display devices include a plurality of light sources to generate the images. In some examples, the display devices include imaging devices to capture images that can be displayed by the display device. In some examples, the imaging devices include cameras that are capable of capturing still images and/or video images.

DETAILED DESCRIPTION

A user may utilize a computing device for various purposes, such as for business and/or recreational use. As used herein, the term computing device refers to an electronic device having a processor and a memory resource. Examples of computing devices include, for instance, a laptop computer, a notebook computer, a desktop computer, and/or a mobile device (e.g., a smart phone, tablet, personal digital assistant, smart glasses, a wrist-worn device, etc.), among other types of computing devices.

In some examples, the computing device include a display device to display images generated by the computing device and/or to allow a user to interact with the computing device. In some examples, the display device is utilized to display a user interface that allows a user to interact with the computing device and/or instruct the computing device to perform particular functions. In some examples, the display device is an expandable or adjustable display device. As used herein, an expandable or adjustable display device includes a display device this can be altered from a first size or first set of physical dimensions to a second size or second set of physical dimensions. For example, an expandable display device includes a rollable display device that rolled or positioned within a cavity of an enclosure to allow a portion of the display device to be viewable through an aperture of the enclosure. In this example, the rollable display device is expandable to a larger size by exposing a larger portion of the display through the aperture of the enclosure.

In these examples, the display device and/or the enclosure of the display device is adjustable to a plurality of different dimensions. For example, the width or length of the display device and/or enclosure is adjustable to a plurality of different widths or lengths. In some examples, the enclosure includes a plurality of imaging devices, such as cameras, that are embedded in the enclosure of the display device. In some examples, a first imaging device is positioned on a first side of an adjustment device and a second imaging device is positioned on a second side of an adjustment device. As used herein, an adjustment device is a portion of the enclosure that is expandable or retractable to allow the dimensions of the display device and/or enclosure to be altered to different sizes and/or shapes. In these examples, the distance between the first imaging device and the second imaging device is changed when the adjustment device is utilized to alter the size or shape of the display device and/or enclosure.

The present disclosure relates to image generation based on altered distances between imaging devices coupled to an enclosure of an adjustable display device. In some examples, the imaging devices captured image data at a plurality of different distances and generate different image types at different distances. For example, a two-dimensional image is generated when the imaging devices are at a relatively small distance or relatively close together and a three-dimensional image is generated when the imaging devices are at a relatively large distance or relatively far part. In a specific example, a two-dimensional image is generated when the distance between the imaging devices is below a threshold distance and a three-dimensional image is generated when the distance between the imaging devices is greater than the threshold distance.

Figure 1A:
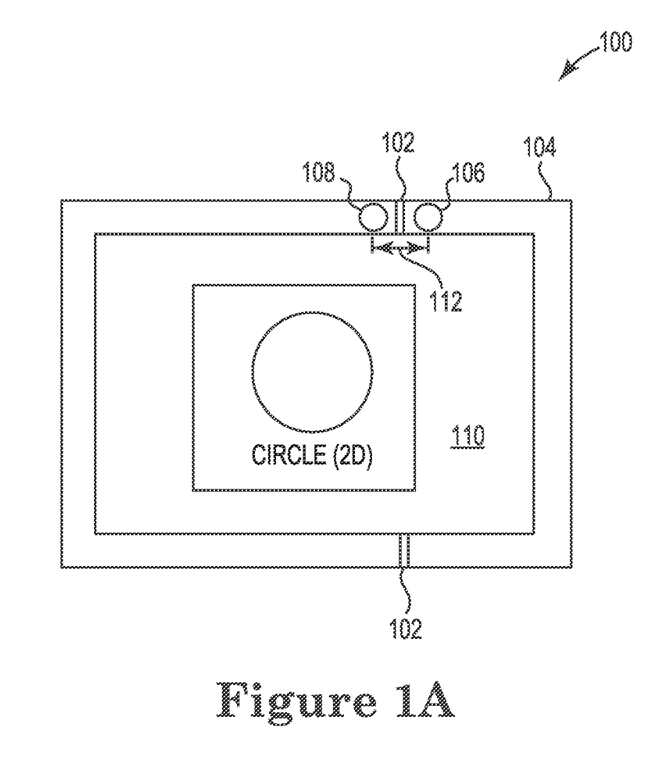
FIG. 1A illustrates an example of a device for image generation based on altered distances between imaging devices.
Figure 2:
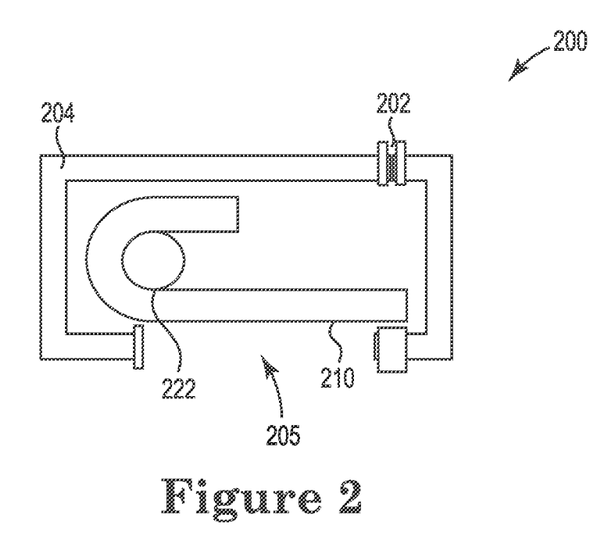
FIG. 2 illustrates an example of a device for image generation based on altered distances between imaging devices.

FIG. 1A illustrates an example of a device 100 for image generation based on altered distances between imaging devices. The device 100 illustrated in FIG. 1A illustrates the device 100 in a collapsed state. As used herein, the collapsed state refers to a state of an adjustment device 102 being partially collapsed, completely collapsed, or at a distance 112 that is below a threshold distance. The device 100 includes a display device 110 that is enclosed by an enclosure 104. As described herein, the display device 110 is an expandable display device that allows the display device 110 to be altered from a first size represented by FIG. 1A to a second size represented by FIG. 2A.

Figure 1B:
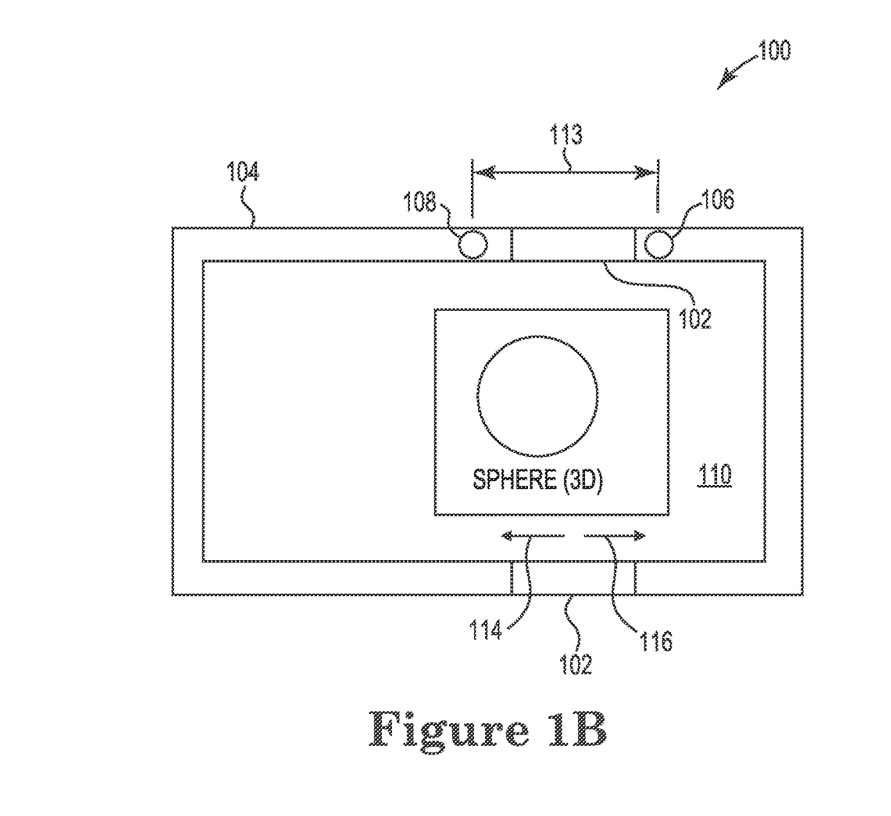
FIG. 1B illustrates an example of a device for image generation based on altered distances between imaging devices.

In some examples, the display device 110 and enclosure 104 represent when the device 100 has a first set of dimensions. For example, the display device 110 and enclosure 104 includes a first length and a first height that can be expanded to a second length and/or a second height represented by FIG. 1A. In this example, the first length can be less than the second length such that a display area of the display device 110 is smaller when the display device 110 is in the collapsed state as represented by FIG. 1A and larger when the display device 110 is in an expanded state as represented by FIG. 1B.

In some examples, the display device 110 is adjustable from a first size to a second size utilizing an adjustment device 102. As used herein, an adjustment device 102 is a device that is capable of adjusting the size or dimensions of an exposed portion or display area of a display device 110 through an enclosure aperture. For example, the adjustment device 102 includes an expandable portion of the enclosure 104 to allow the expandable display device 110 to occupy a greater area within the enclosure 104. In this example, the adjustment device 102 is capable of altering the size of the enclosure 104, altering a size of the aperture of the enclosure 104, and/or altering a size of a portion of the display device 110 that is exposed to a user.

Figure 3:
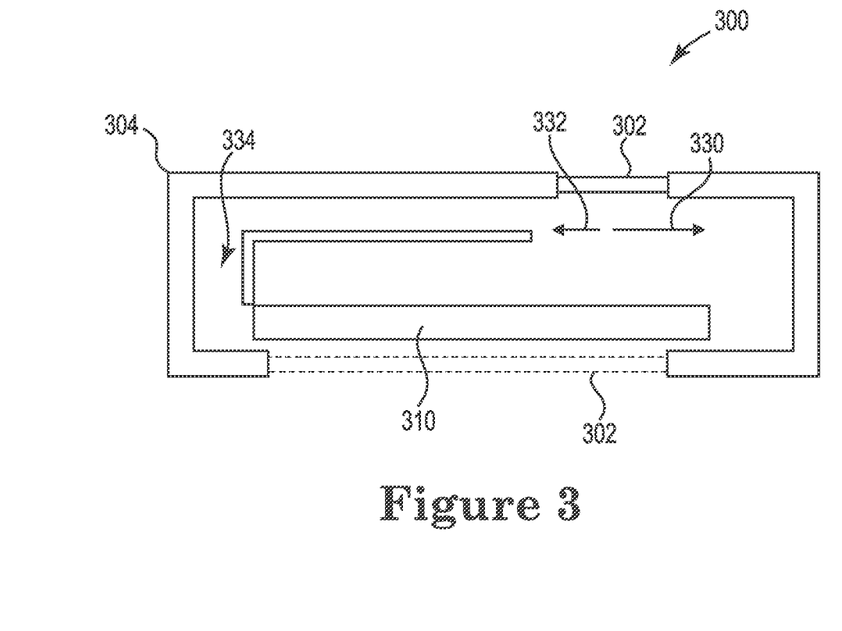
FIG. 3 illustrates an example of a device for image generation based on altered distances between imaging devices.

In some examples, the adjustment device 102 is capable of altering the physical dimensions of a display area of the expandable display device 110 from a first size to a second size. In these examples, the first imaging device 106 is a first distance (e.g., distance 112) from the second imaging device 108 when the expandable display device 110 has the first size. In these examples, the first imaging device 106 is a second distance (e.g., distance 113 as illustrated in FIG. 1B) from the second imaging device 108 when the expandable display device 110 has the second size. Further examples, of the adjustment device 102 are illustrated in FIG. 2 and FIG. 3.

As illustrated in FIG. 1A, the distance 112 between a first imaging device 106 and a second imaging device 108 is altered when the distance of the adjustment device 102 is altered. For example, the distance 112 includes a minimum distance between the first imaging device 106 and the second imaging device 108. In this example, the adjustment device 102 is completely collapsed that is not capable of further decreasing the distance 112 between the first imaging device 106 and the second imaging device 108. In these examples, the adjustment device 102 is capable of expanding or increase the distance 112 to a distance 113 as illustrated in FIG. 1B.

FIG. 1B illustrates an example of a device 100 for image generation based on altered distances between imaging devices. The device 100 includes the same components as device 100 as referenced in FIG. 1A. The device 100 illustrates an expanded state of the device 100. As described herein, an expanded state includes a state when the adjustment device 102 is partially or completely expanded to a distance greater than a minimum distance or greater than a threshold distance.

In some examples, the display device 110 illustrates when the adjustment device 102 has been expanded in the direction of arrow 116 to increase a length of the display device 110 and/or the enclosure 104. In a similar way, the display device 110 as illustrated in FIG. 1A illustrates when the adjustment device 102 has been moved in the direction of arrow 114 to decrease the length of the display device 102 and/or the display area of the display device 110. As described herein, the distance 113 is adjustable based on the adjustment device 102. In these examples, the adjustment device 102 is moved in the direction of arrow 116 to increase a size of the display device 110 and increase the distance 113 of the first imaging device 106 and the second imaging device 108. In these examples, the distance 113 is larger than the distance 112 as illustrated in FIG. 1A since the adjustment device 102 has been moved in the direction of arrow 116 to increase a size of the display device 110 by increasing a size of the enclosure 104.

In some examples, the first imaging device 106 is coupled to the enclosure 104 at a first fixed location and the second imaging device 108 is coupled to the enclosure 104 at a second fixed location. For example, the first imaging device 106 is embedded in the enclosure 104 on a first side of the adjustment device 102 and the second imaging device 108 is embedded in the enclosure 104 on a second side of the adjustment device 102. In this way, a distance 112, 113 between the first imaging device 106 and the second imaging device 108 is determined based on a position of the adjustment device 102. For example, the adjustment device 102 is expandable to increase a size of the display device 110 and/or retractable to decrease the size of the display device 110. In this example, the adjustment device 102 includes a sensor to determine a distance of increase and/or a distance of decrease that is utilized to determine the distance 112, 113 between the first imaging device 106 and the second imaging device 108 for a plurality of different distances of the adjustment device 102.

In some examples, the distance 112, 113 indicates a type of image to be generated by first image data captured by the first imaging device 106 and second image data captured by the second imaging device 108. For example, the distance 112 as illustrated in FIG. 1A can indicate that a two-dimensional image is to be generated when the distance 112 is below a threshold distance and the distance 113 can indicate that a three-dimensional image is to be generated when the distance 113 is at or above the threshold distance. As used herein, a threshold distance is a defined distance between the first imaging device 106 and the second imaging device 108 that is great enough to allow a three-dimensional image to be generated utilizing image data captured by the first imaging device 106 and the second imaging device 108. That is, a distance that is equal to or greater than the threshold distance is to be utilized to generate a three-dimensional image and a distance that is less than the threshold distance is to be utilized to generate a two-dimensional image.

In some examples, the first image data captured by the first imaging device 106 and the second image data captured by the second imaging device 108 includes image data and depth data. In some examples, the distance 112 as illustrated in FIG. 1A can indicate that the first image data captured by the first imaging device 106 and the second image data captured by the second imaging device 108 is to be utilized to generate a two-dimensional image when the distance 112 is below the threshold distance. In some examples, the distance 113 as illustrated in FIG. 1B can indicate that the first image data captured by the first imaging device 106 and the second image data captured by the second imaging device 108 is to be utilized to generate a three-dimensional image when the distance 113 is above the threshold distance.

In some examples, the generation of a two-dimensional image or a three-dimensional image can be dynamically altered as the adjustment device 102 is altered between the directions of arrow 116 and arrow 114. As used herein, dynamically altering the generated image can include capturing image data during a transition from a first distance (e.g., distance 112 as illustrated in FIG. 1A) to a second distance (e.g., distance 113 as illustrated in FIG. 1B) and altering the type of image generated when the distance exceeds a threshold distance. In some examples, dynamically altering the generated image can include continuously updating the distance between the first imaging device 106 and the second imaging device 108 during the transition between the first distance and the second distance.

In some examples the generation of the two-dimensional image includes generating an image from the first image data captured by the first imaging device 106 and the second image data captured by the second imaging device 108 to replicate an image that was captured by a single imaging device when the device 100 is in the collapsed state as illustrated in FIG. 1A. In some examples, the generation of the three-dimensional image includes generating an image from the first image data captured by the first imaging device 106 and the second image data captured by the second imaging device 108 to generate a three-dimensional projection utilizing first depth data associate with the first image data and second depth data associated with the second image data. In this example, triangulation can be utilized with a calculation utilizing the first image data, second image data, first depth data, second depth data and the distance 113.

In some examples, calculations such as stratification reconstruction calculations. A plurality of different calculations can be utilized to generate a three-dimensional image from a plurality of images (e.g., image data) when depth data and a distance between the imaging devices that captured the image data and depth data is known. Since the distance 113 between the imaging devices (e.g., first imaging device 106, second imaging device 108, etc.) are known or calculated based on a distance or position of the adjustment device 102, the three-dimensional image can be calculated utilizing the captured image data.

FIG. 2 illustrates an example of a device 200 for image generation based on altered distances between imaging devices. In some examples, the device 200 is the same or similar device as device 100 as represented in FIG. 1A and FIG. 1B. For example, the device 200 is a top view or bottom view of the device 100 as represented in FIG. 1A and FIG. 1B. In these examples, the device 200 includes the same or similar elements as device 100 as represented in FIG. 1A and FIG. 1B. For example, the device 200 includes a display device 210 positioned within an enclosure 204. In some examples, the display device 210 is a flexible display device that is adjustable from a first size to a second size that is viewable through an aperture 205 of the enclosure 204.

In some examples, the enclosure 204 includes an adjustment device 202 that can increase an area of the display device 210 that is viewable through an aperture 205 of the enclosure 204 to make the display device 202 relatively smaller or relatively larger. For example, the adjustment device 202 can be positioned to allow a first portion of the display device 210 to be exposed through an aperture 205 of the enclosure 204 with a second portion of the display device 210 wrapped around a wrapping mechanism 222. In this example, the adjustment device 202 and wrapping mechanism 222 work together to position the second portion of the display device 210 within the enclosure 204 such that the second portion of the display device 210 is not viewable through the aperture 205 of the enclosure 204. In this way, the dimensions or display area of the display device 210 appear relatively smaller than the when the adjustment device 202 moves in the direction of arrow 203 since the second portion of the display device 210 is not viewable through the aperture 205 of the enclosure 204. In addition, the dimensions of the enclosure 204 are relatively smaller than the dimensions of the enclosure 204 when the adjustment device 202 moves in the direction of arrow 203.

In some examples, the adjustment device 202 is moveable to increase a size of the enclosure 204 and increase a size of the aperture 205 of the enclosure 204 such that a greater portion of the display device 210 is viewable through the aperture 205 of the enclosure 204. For example, the adjustment device 202 can be expanded in the direction of arrow 203 to increase the dimensions of the enclosure 204 and increase the dimensions of the aperture 205 of the enclosure 204. In this example, the wrapping mechanism 222 allows a portion of the display device 210 previously within the enclosure 204 to be exposed through the aperture 205 of the enclosure 204. In this way, the size of the aperture 205 of the enclosure 204 is greater when the adjustment device 202 is moved in the direction of arrow 204 compared to the size of the aperture 205 of the enclosure 204 when the adjustment device is in the collapsed state as illustrated in FIG. 2. When a first imaging device is positioned on a first side of the aperture 205 and a second imaging device is positioned on a second side of the aperture 205, the distance between the first imaging device and the second imaging device is adjustable based on the distance of the adjustment device 202.

FIG. 3 illustrates an example of a device 300 for image generation based on altered distances between imaging devices. In some examples, the device 300 includes the same or similar elements as device 200 as referenced in FIG. 2 and/or device 100 as referenced in FIG. 1A and FIG. 1B. For example, the device 300 includes a display device 310 that is an adjustable display device. In some examples, the device 300 includes an adjustment device 302 that expands or retracts a size or dimensions of the enclosure 304 of the device 300.

In some examples, the adjustment device 302 includes a spring loaded or spring mechanism to apply a force on the enclosure 304 in the direction of arrow 332. In this way, a force can be applied in the direction of arrow 330 to expand the size of the enclosure 304 and/or the display device 310 and the spring mechanism can apply a force in the direction of arrow 332 to decrease the size of the enclosure 304 and/or the display device 310. In some examples, the adjustment device 302 can be positioned on a rear portion of the device 300 and a front portion of the device 300 to ensure an equal application of pressure to force the display device 310 into a channel 334 when the spring force moves the adjustment device 302 in the direction of arrow 332. In some examples, the adjustment device 302 forces the display device 310 through an aperture connected to the channel 334 and extracts the display device 310 through the aperture connected to the channel 334.

As described herein, the adjustment device 302 includes a sensor to identify a distance of expansion or contraction such that a distance is determined between a first imaging device and a second imaging device. In these examples, the first imaging device and the second imaging device are embedded or coupled to a particular location on the enclosure 304 and is adjustable when the adjustment device 302 moves or alters the dimensions of the enclosure 304.

Figure 4:
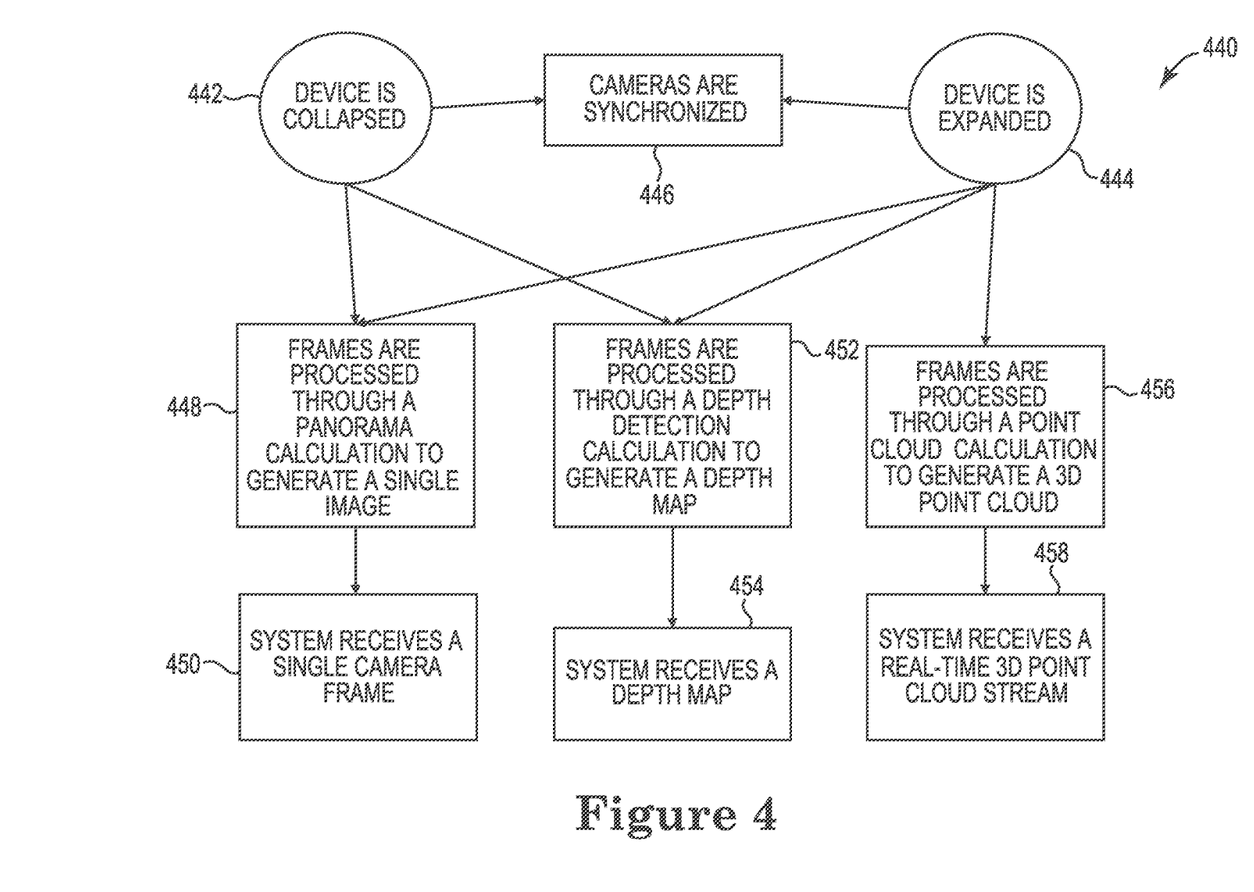
FIG. 4 illustrates an example of a method for image generation based on altered distances between imaging devices.

FIG. 4 illustrates an example of a method 440 for image generation based on altered distances between imaging devices. In some examples, the method 440 is executable by a processor. For example, the method 440 includes steps or elements that are stored on a non-transitory memory resource that are executed by a processor to perform the corresponding functions.

In some examples, the method 440 includes determining the device is collapsed at 442. As used herein, the device is determined to be collapsed when the adjustable display device is in a collapsed or relatively smaller dimensions. In some examples, the distance between a first imaging device and a second imaging device can be utilized to determine when the device is in a collapsed orientation. For example, when the distance between the first imaging device and the second imaging device is below a threshold distance, the device is determined to be in a collapsed orientation.

In some examples, the method 440 includes processing image data from the imaging devices in a panorama calculation at 448 utilizing image data that can include depth data as described herein. In some examples, the panorama calculation is utilized to generate a panorama image utilizing the image data and depth data for a plurality of imaging devices and the distance between the imaging devices. In some examples, generating a panorama image includes generating an image that includes an aspect ratio of a panoramic image. As used herein, a panoramic image is an image with a horizontally elongated field of view. In some examples, the panoramic image is a single image that is a two-dimensional image to simulate a single imaging device when a plurality of imaging devices is utilized to generate the panoramic image.

In some examples, the method 440 includes a system receiving a single camera frame at 450. As used herein, the system receiving the single camera frame includes generating a single camera frame to be provided to the system. In some examples, the single camera frame includes a two-dimensional image that is generated utilizing a plurality of imaging devices. In some examples, the single camera frame is an image to simulate an image captured by a single imaging device.

In some examples, the method 440 includes determining the device is expanded at 444. In some examples, determining the device is expanded includes determining that an adjustment device has expanded to increase a distance between a first imaging device and a second imaging device such that the distance exceeds a threshold distance. In some examples, the device is expanded when the distance of a display device is expanded beyond a threshold distance. In some examples, the distance between the first imaging device and the second imaging device is a current distance based on the adjustment device or a position of the adjustment device.

In some examples, the method 440 can include calculating a current distance between the first imaging device and the second imaging device based on a mechanical distance determination of the adjustment device. For example, the mechanical distance can include a rotational distance of a wrapping mechanism. In this example, the rotational distance of the wrapping mechanism can be utilized to calculate the current distance or altered distance of the adjustment device. As described herein, the distance or altered distance of the adjustment device is utilized to determine the distance or current distance between the first imaging device and the second imaging device.

In some examples, the method 440 includes processing frames of image data from the first imaging device and/or second imaging device to generate a three-dimensional image utilizing a three-dimensional point cloud at 456. As used herein, the frames of the image data refer to captured image frames or captured image portions of the image data. As described herein, the image data also includes depth data that can be utilized to generate a depth mask. As used herein, a three-dimensional point cloud includes a 3D model that consists of a relatively large number of points in three-dimensional space. Point clouds can use the Cartesian coordinate system (X, Y, Z) to define the position of each point.

In some examples, the method 440 includes a real time three-dimensional point cloud stream being provided to a system at 458. In some examples, the real time three-dimensional point cloud stream includes a stream of generated three-dimensional images generated by the image data from a plurality of imaging devices that collect image frames and depth data.

In some examples, the method 440 includes synchronizing the plurality of imaging devices at 446. In some examples, the imaging devices are synchronized when the device is collapsed, expanded, or positioned between a collapsed state and expanded state. Synchronizing the imaging devices includes utilizing image data and time stamp data to utilize the image data corresponding to the same time stamp data to synchronize the image data collected at particular times by the plurality of imaging devices. In this way, the image data is collected and combined to generate images based on the time stamp of the captured image data.

In some examples, the method 440 includes generating a depth mask by processing frames from the imaging devices through a depth detection calculation 452. As used herein, a depth detection calculation includes utilizing the depth data from the plurality of frames of the plurality of imaging devices to generate a depth mask or depth map of the image. In some examples, the depth detection calculation can determine a depth or distance from the imaging device for each of a plurality of pixels of the plurality of frames of the image data. In this way, the depth map of the image includes a corresponding depth or distance between the imaging device and an object that represents a pixel of the image.

In some examples, the method 440 includes providing the depth map to a system to be utilized 454. As described herein, a depth map can be utilized to generate a three-dimensional representation of image data captured by the plurality of imaging devices and the distance between the plurality of imaging devices.

Figure 5:
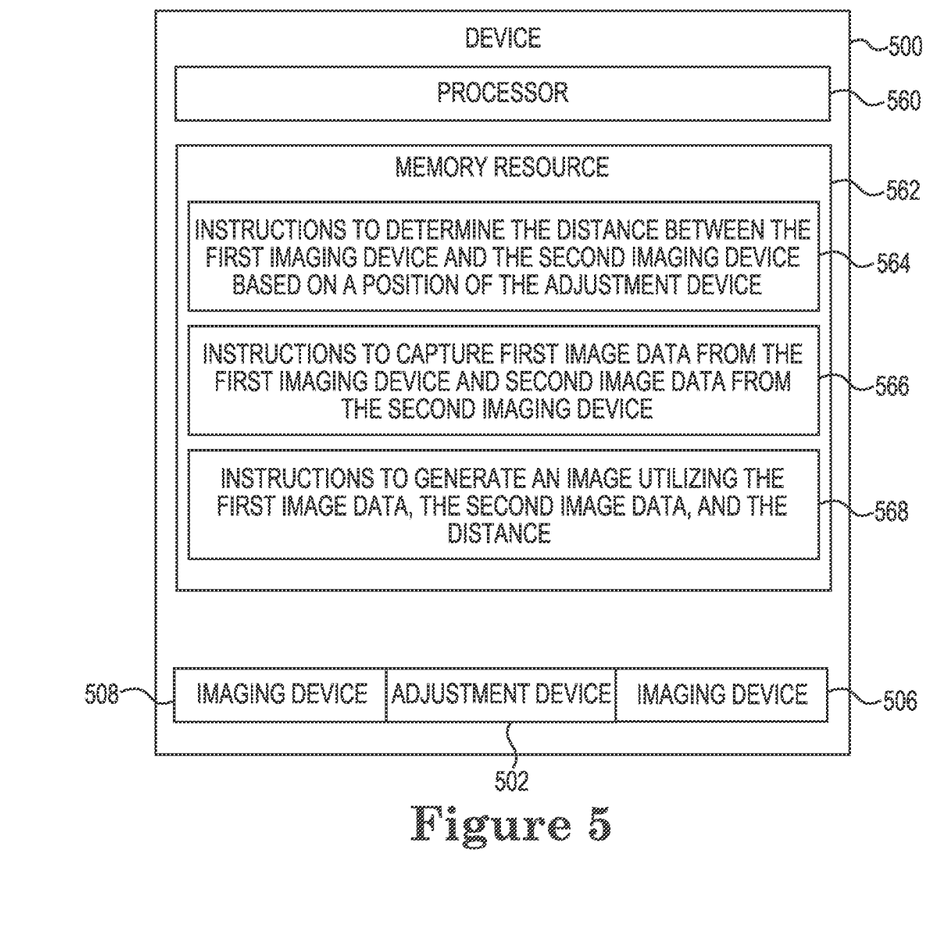
FIG. 5 illustrates an example of a device for image generation based on altered distances between imaging devices.

FIG. 5 illustrates an example of a device 500 for image generation based on altered distances between imaging devices. In some examples, the device 500 is a computing device that includes a first imaging device 506, a second imaging device 508, and an adjustment device 502 that can alter a distance between the first imaging device 506 and the second imaging device 508. In some examples, the device 500 includes the same or similar elements as device 300 as referenced in FIG. 3, device 200 as referenced in FIG. 2, and/or device 100 as referenced in FIG. 1A and FIG. 1B. For example, the device 500 includes an adjustment device 502 that is capable of altering a size of flexible display device such that the distance between the first imaging device 506 and the second imaging device is adjustable.

In some examples, the device 500 is a computing device that includes a display device to display images and/or allow a user to interact with the device 500. In some examples, the display device displays a user interface associated with the device 500 to allow a user to provide inputs to the device 500 and instruct the device 500 to perform particular functions. In some examples, the display device is capable of displaying two-dimensional and/or three-dimensional images.

The device 500 includes instructions 564 that are executed by the processor 560 to determine the distance between the first imaging device 506 and the second imaging device 508 based on a position of the adjustment device 502. As described herein, the adjustment device 502 includes mechanical mechanisms that alter the dimensions of a display device and/or enclosure of the display device. In this way, the mechanical mechanisms can be utilized to determine a distance of expansion of the adjustment device 502, such that the distance of the adjustment device 502 is utilized to determine the adjusted distance of the first imaging device 506 and the second imaging device 508. That is, the instructions 564 can be executed by the processor 560 to determine the distance between the first imaging device 506 and the second imaging device 508 has changed based on an alteration of the adjustment device 502. In some examples, the sensor can be coupled or interact with the mechanical mechanisms that allow the adjustment device 502 to alter a size of the display device.

The device 500 includes instructions 566 that are executed by the processor 560 to capture first image data from the first imaging device 506 and second image data from the second imaging device 508. In some examples, the instructions 566 are executed by the processor 560 to capture first image data from the first imaging device 506 and second image data from the second imaging device 508 at the position of the adjustment device 502. As described herein, the first imaging device 506 captures first image data that is separate from the second image data captured by the second imaging device 508.

The device 500 includes instructions 568 that are executed by the processor 560 to generate an image utilizing the first image data, the second image data, and the distance. As described herein, the first image data, the second image data, and the distance between the first imaging device 506 and the second imaging device 508 to generate a particular type of image. For example, a first type of image is generated when the distance is less than a threshold distance and a second type of image is generated when the distance is greater than the threshold distance. In these examples, the first type of image is a two-dimensional image to simulate a single imaging device and the second type of image is a three-dimensional image.

In some examples, the device 500 includes a processor 560 communicatively coupled to a memory resource 562. As described further herein, the memory resource 562 includes instructions 564, 566, 568 that are executed by the processor 560 to perform particular functions.

The device 500 includes components such as a processor 560. As used herein, the processor 560 includes, but is not limited to: a central processing unit (CPU), an application specific integrated circuit (ASIC), a field programmable gate array (FPGA), a metal-programmable cell array (MPCA), a semiconductor-based microprocessor, or other combination of circuitry and/or logic to orchestrate execution of instructions 564, 566, 568. In other examples, the device 500 includes instructions 564, 566, 568, stored on a machine-readable medium (e.g., memory resource 562, non-transitory computer-readable medium, etc.) and executable by a processor 560. In a specific example, the device 500 utilizes a non-transitory computer-readable medium storing instructions 564, 566, 568, that, when executed, cause the processor 560 to perform corresponding functions.

Figure 6:
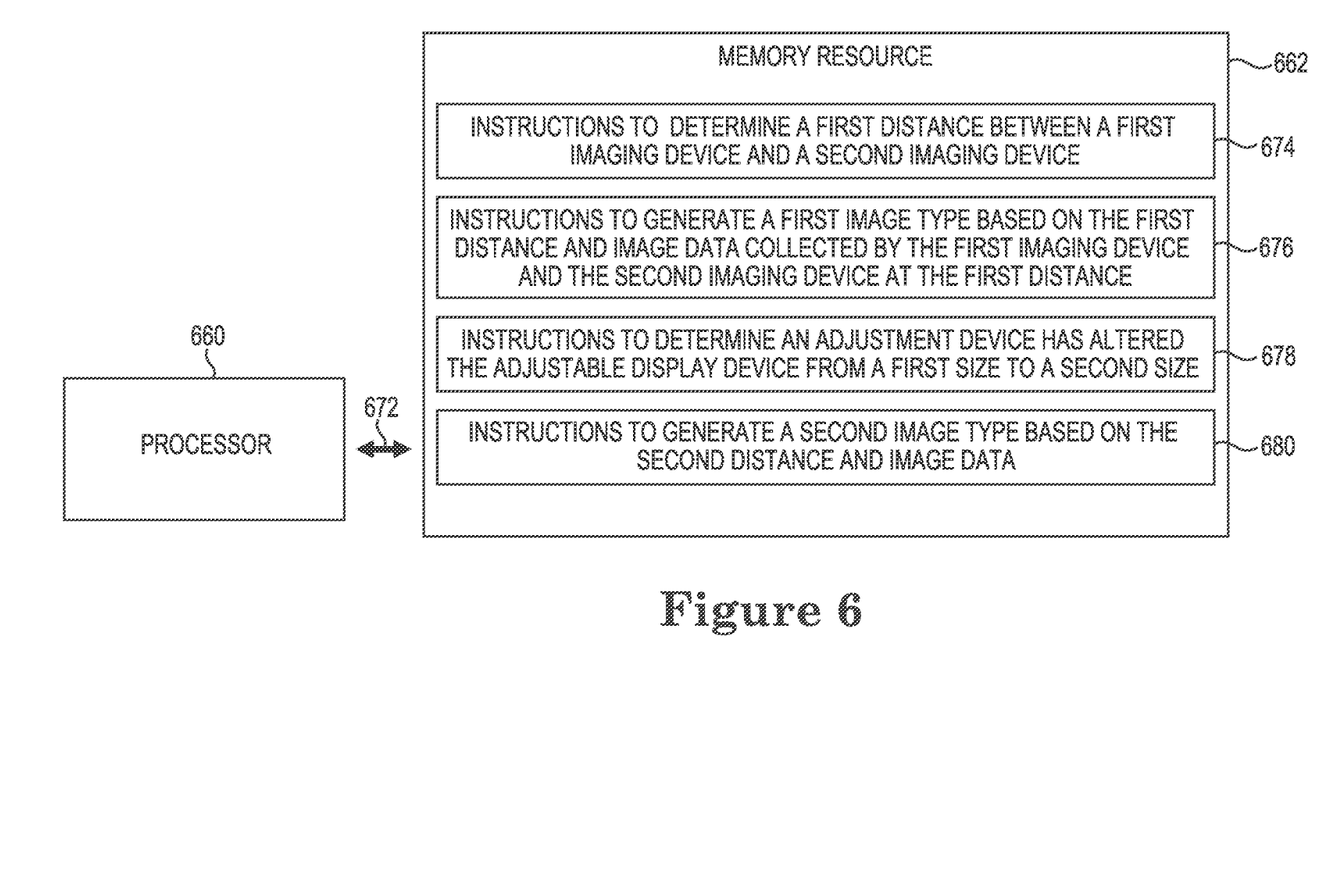
FIG. 6 illustrates an example of a memory resource for image generation based on altered distances between imaging devices.

FIG. 6 illustrates an example of a memory resource 662 for image generation based on altered distances between imaging devices. In some examples, the memory resource 662 is part of a computing device or controller that can be communicatively coupled to a computing system. For example, the memory resource 662 is part of a device 100 as referenced in FIG. 1A and FIG. 1B. In some examples, the memory resource 662 is communicatively coupled to a processor 660 that executes instructions 674, 676, 678, 680, stored on the memory resource 662. For example, the memory resource 662 is communicatively coupled to the processor 660 through a communication path 672. In some examples, a communication path 672 includes a wired or wireless connection that allows communication between devices and/or components within a single device.

The memory resource 662 may be electronic, magnetic, optical, or other physical storage device that stores executable instructions. Thus, a non-transitory machine-readable medium (MRM) (e.g., a memory resource 662) may be, for example, a non-transitory MRM comprising Random-Access Memory (RAM), read-only memory (ROM), an Electrically-Erasable Programmable ROM (EEPROM), a storage drive, an optical disc, and the like. The non-transitory machine-readable medium (e.g., a memory resource 662) may be disposed within a controller and/or computing device. In this example, the executable instructions 674, 676, 678, 680, can be "installed" on the device. Additionally, and/or alternatively, the non-transitory machine-readable medium (e.g., a memory resource 662) can be a portable, external or remote storage medium, for example, that allows a computing system to download the instructions 674, 676, 678, 680, from the portable/external/remote storage medium. In this situation, the executable instructions may be part of an "installation package". As described herein, the non-transitory machine-readable medium (e.g., a memory resource 662) can be encoded with executable instructions for establishing transfer locations.

In some examples, the memory resource 662 includes instructions 674 to determine a first distance between a first imaging device and a second imaging device. In some examples, the instructions 674 determine a first distance between a first imaging device coupled to a first portion of an enclosure of an adjustable display device and a second imaging device coupled to a second portion of the enclosure of the adjustable display device. In some examples, the first distance is different than the second distance. In some examples, the first distance is relatively smaller than the second distance. In some examples, the first distance corresponds to a collapsed state and the second distance corresponds to an expanded state of the device.

As described herein, the first distance and/or the second distance is calculated based on a position or location of an adjustment device. For example, the position of the adjustment device can correspond to a particular physical location of the first imaging device and the second imaging device. In this example, the particular physical location of the first imaging device and the second imaging device is utilized to determine the first location and the second location.

In some examples, the memory resource 662 includes instructions 676 to generate a first image type based on the first distance and image data collected by the first imaging device and the second imaging device at the first distance. In some examples, the first image type is a two-dimensional image that is generated to mimic an image captured by a single imaging device. For example, the two-dimensional image includes a panoramic image that is generated utilizing the image data from the first imaging device and the second imaging device to mimic an image that would be generated by a single imaging device.

In some examples, the memory resource 662 includes instructions 678 to determine an adjustment device has altered the adjustable display device from a first size to a second size. In some examples, the instructions 678 determine an adjustment device has altered the adjustable display device from a first size to a second size and the first distance between the first imaging device and the second imaging device to a second distance. As described herein, the adjustment device is capable of altering a size of the display device, enclosure of the display device, and distance between the first imaging device and the second imaging device.

In some examples, the first imaging device is positioned on a first side of the adjustment device and the second imaging device is positioned on a second side of the adjustment device such that the distance between the first imaging device and the second imaging device is increased or decreased when the adjustment device is increased or decreased.

In some examples, the memory resource 662 includes instructions 680 to generate a second image type based on the second distance and image data. In some examples, the instructions 680 generate a second image type based on the second distance and image data collected by the first imaging device and the second imaging device at the second distance. As described herein, the second image type can include a three-dimensional image that is generated utilizing a three-dimensional point cloud from the image data and depth data captured by the first imaging device and the second imaging device. In this way, the image type is alternated based on the determined distance between the first imaging device and the second imaging device. For example, the image type is altered from the first image type to the second image type as the adjustable display device is altered from a first size to a second size. In this example, the adjustable display device generates a two-dimensional image in a collapsed state then generates a three-dimensional image when the adjustable display device is altered to an expanded state. In some examples, the two-dimensional image may be presented on the adjustable display device in the collapsed state and the three-dimensional image may be presented on the adjustable display device in the expanded state.

Figure 7:
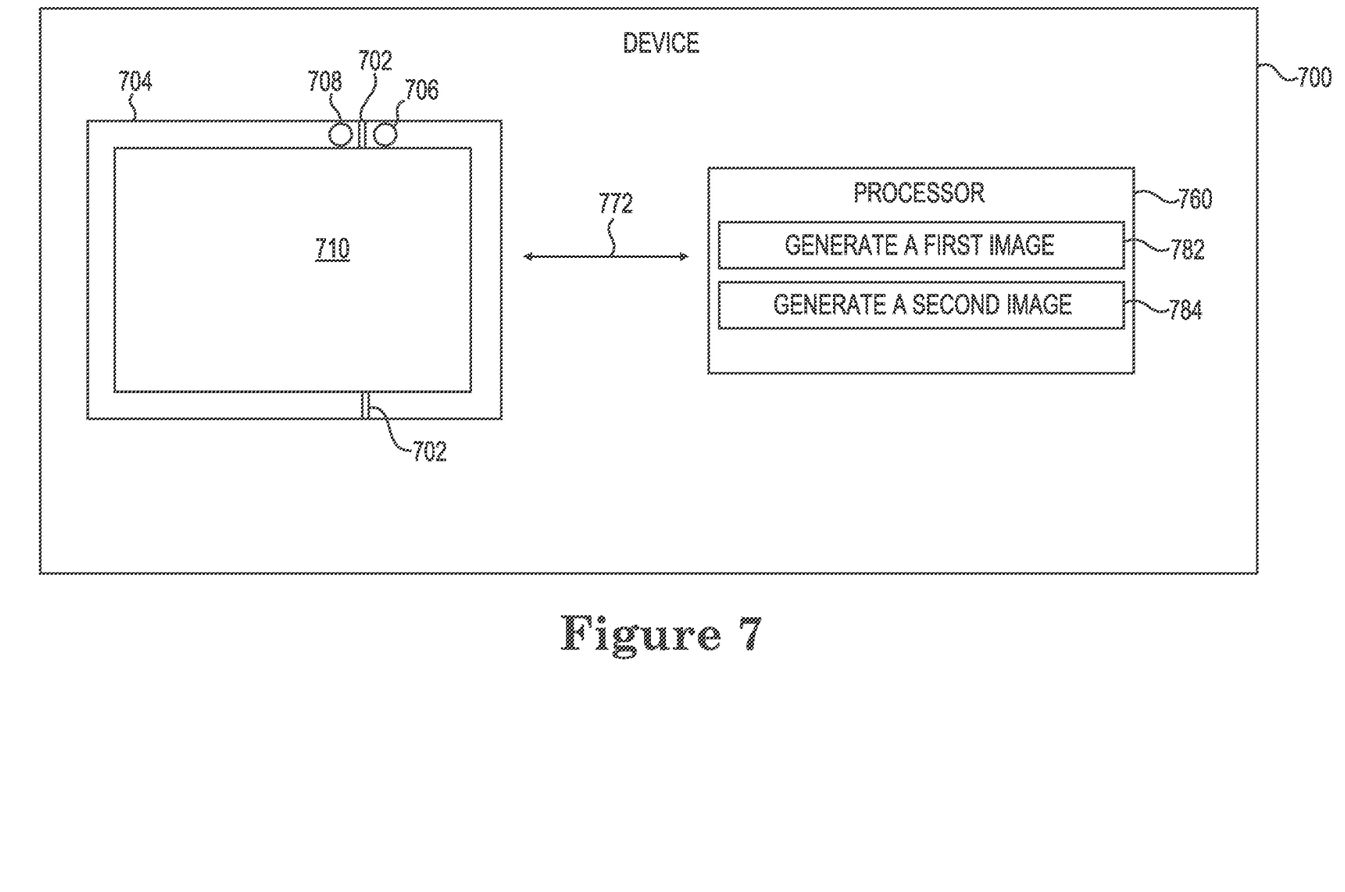
FIG. 7 illustrates an example of a device for image generation based on altered distances between imaging devices.

FIG. 7 illustrates an example of a device 700 for image generation based on altered distances between imaging devices. In some examples, the device 700 includes the same elements as device 100 as referenced in FIG. 1A and FIG. 1B. For example, the device 700 includes a first imaging device 706 and a second imaging device 708 that are separated by an adjustment device 702, such that the adjustment device 702 is capable of altering the distance between the first imaging device 706 and the second imaging device 708.

In some examples, the processor 760 is a device that includes hardware, such as an ASIC, central processing unit (CPU) or other processing resource to execute particular instructions 782, 784 and communicatively coupled to the display device 710 via 772. In some examples, the instructions 782, 784 are stored on a non-transitory computer readable medium (e.g., memory resource, etc.) and executed by the processor 760 to perform the corresponding functions.

The device 700 includes instructions 782 that are executed by the processor 760 to generate a first image. In some examples, the instructions 782 generate a first image based on first image data captured by the first imaging device 706, second image data captured by the second imaging device 708, and a first distance at the first size. As described herein, the device 700 includes an adjustment device 702 to increase or decrease a size of the display device 710 and/or the enclosure 704. By increasing the size of the adjustment device 702 to increase the size of the display device 710 and/or enclosure 704, the distance between the first imaging device 706 and the second imaging device is also increased. In a similar way, decreasing the size of the adjustment device decreases the distance between the first imaging device 706 and the second imaging device 708.

As described herein, the first image is based on the distance between the first imaging device 706 and the second imaging device 708. For example, the first image is a two-dimensional image when the distance is below a threshold distance and the first image is a three-dimensional image when the distance is above the threshold distance. In some examples, the first image data and the second image data correspond to a particular location of the first imaging device 706 and second imaging device 708 or first distance.

The device 700 includes instructions 784 that are executed by the processor 760 to generate a second image. In some examples, the instructions 784 generate a second image based on third image data captured by the first imaging device 706, fourth image data captured by the second imaging device 708, and a second distance at the second size. In some examples, the second size is different than the first size. The second size can include an adjusted size that is changed from the first size through a change of the adjustment device 702. In some examples, the third image data and fourth image data are captured when the first imaging device 706 and the second imaging device 708 are at a second location that corresponds to the second size.

In some examples, the second image is a different type of image than the first image. For example, the first size can position the first imaging device 706 and the second imaging device 708 below a threshold distance and the second size can position the first imaging device 706 and the second imaging device 708 above a threshold distance. In this example, the first image data and the second image data are utilized to generate two-dimensional images, and the third image data and fourth image data are utilized to generate three-dimensional images.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. Further, as used herein, "a" refers to one such thing or more than one such thing.

The figures herein follow a numbering convention in which the first digit corresponds to the drawing figure number and the remaining digits identify an element or component in the drawing. For example, reference numeral 102 may refer to element 102 in FIG. 1 and an analogous element may be identified by reference numeral 302 in FIG. 3. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

It can be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc.

The above specification, examples, and data provide a description of the system and methods of the disclosure. Since many examples can be made without departing from the spirit and scope of the system and method of the disclosure, this specification merely sets forth some of the many possible example configurations and implementations.

What is claimed is:

1. A device, comprising:
an expandable enclosure comprising a side having an overall length that may be linearly modified;
a first imaging device located on a first location on the side of the expandable enclosure;
a second imaging device located on a second location on the side of the expandable enclosure;
an adjustment device located on the side and between the first location and the second location of the expandable enclosure, wherein the adjustment device is to alter linear distance between the first imaging device and the second imaging device based on changing the overall length of the side; and a processor to:
  determine the linear distance between the first imaging device and the second imaging device;
  in response to determining that the linear distance between the first imaging device and the second imaging device is less than a threshold, generate a two-dimensional image based on captured first image data from the first imaging device and second image data from the second imaging device; and
  in response to determining that the linear distance between the first imaging device and the second imaging device is at or above the threshold, generate a three-dimensional image based on captured first image data from the first imaging device and second image data from the second imaging device.

2. The device of claim 1, wherein the processor is to determine the linear distance between the first imaging device and the second imaging device has changed based on an alteration of the adjustment device.

3. The device of claim 2, wherein the processor is to capture image data from the first imaging device and the second imaging device at the changed linear distance and alter the image based on the changed distance.

4. The device of claim 1, wherein the adjustment device includes a sensor to determine the linear distance between the first imaging device and the second imaging device.

5. The device of claim 1, wherein the adjustment device includes a mechanical mechanism to linearly modify the overall length by increasing or decreasing the linear distance between the first imaging device and the second imaging device.

6. A non-transitory memory resource storing machine-readable instructions stored thereon that, when executed, cause a processor of a computing device to:
  determine a first linear distance between a first imaging device coupled to a first portion along a side of an enclosure of an adjustable display device and a second imaging device coupled to a second portion of the enclosure along the side of the adjustable display device;
  in response to determining that the first linear distance is less than a threshold, generate a two-dimensional image based on the first linear distance and image data collected by the first imaging device and the second imaging device at the first distance, or in response to determining that the first linear distance is at or above the threshold, generate a three-dimensional image based on the first distance and image data collected by the first imaging device and the second imaging device at the first distance;
  determine an adjustment device located along the side of the enclosure has altered the adjustable display device from a first size to a second size and the first linear distance between the first imaging device and the second imaging device to a second linear distance; and
  in response to determining that the second linear distance is less than the threshold, generate the two-dimensional image based on the second distance and image data collected by the first imaging device and the second imaging device at the second distance, or in response to determining that the second linear distance is at or above the threshold, generate the three-dimensional image based on the second distance and image data collected by the first imaging device and the second imaging device at the second distance.

7. The memory resource of claim 6, wherein when the instructions are executed further cause the processor to instruct the first imaging device and the second imaging device to capture image data when the adjustment device alters the linear distance between the first imaging device and the second imaging device from the first distance to the second distance.

8. The memory resource of claim 6, wherein the three-dimensional image includes depth data.

9. A device, comprising:
  an enclosure that includes a first imaging device and a second imaging device disposed on a side of the enclosure, wherein a linear distance between the first imaging device and the second device is measured according to the side of the enclosure;
  an expandable display device within the enclosure;
  an adjustment device comprising a mechanical mechanism to:
    alter a dimension of the side of the enclosure between a first length and a second length; and
    alter the linear distance between the first imaging device and the second imaging device, wherein the linear distance between the first imaging device and the second imaging device is dependent on the first length and the second length of the dimension of the side of the enclosure; and
  a processor to:
    determine the linear distance between the first imaging device and the second imaging device;
    in response to determining that the linear distance between the first imaging device and the second imaging device is less than a threshold, generate a two-dimensional image based on first image data captured by the first imaging device or second image data captured by the second imaging device; and
    in response to determining that the distance between the first imaging device and the second imaging device is at or above the threshold, generate a three-dimensional image based on third image data captured by the first imaging device and fourth image data captured by the second imaging device.

10. The device of claim 9, wherein the processor is to generate the two-dimensional image to simulate a single imaging device utilizing the first image data from the first imaging device and the second image data from the second imaging device.

11. The device of claim 9, wherein the processor is to generate a first depth map based on the first image data and second image data at the first length and a second depth map based on the third image data and fourth image data at the second length.

12. The device of claim 9, wherein the processor is to calculate a current linear distance between the first imaging device and the second imaging device based on a mechanical operation of a mechanical mechanism of the adjustment device.

13. The device of claim 1, wherein the device is to generate the two-dimensional image based on processing the first image data and the second image data by using a panorama calculation.

14. The device of claim 1, wherein the device is to generate the three-dimensional image based on processing the captured first image data from the first imaging device and second image data from the second imaging device by using a three-dimensional point cloud calculation.

15. The device of claim 1, wherein the three-dimensional image is generated based on depth data of the captured first and second image data.

16. The memory resource of claim 6, wherein when the instructions are executed further cause the processor to generate the two-dimensional image based on processing the first image data and the second image data by using a panorama calculation.

17. The memory resource of claim 6, wherein when the instructions are executed further cause the processor to generate the three-dimensional image based on processing the image data collected by the first imaging device and the second imaging device by using a three-dimensional point cloud calculation.

18. The memory resource of claim 6, wherein the three-dimensional image is generated based on depth data of the image data collected by the first imaging device and the second imaging device.

19. The device of claim 9, wherein the device is to generate the two-dimensional image based on processing the first image data and the second image data by using a panorama calculation.

20. The device of claim 9, wherein the device is to generate the three-dimensional image based on processing the third image data and the fourth image data by using a three-dimensional point cloud calculation.

21. The device of claim 9, wherein the three-dimensional image is generated based on depth data of the captured third and fourth image data.

\* \* \* \* \*